(12) United States Patent
Belakshe et al.

(10) Patent No.: US 11,286,413 B2
(45) Date of Patent: Mar. 29, 2022

(54) MODIFIED BIOPOLYMERS FOR DIVERSION, CONFORMANCE, AND FLUID LOSS CONTROL

(71) Applicant: Halliburton Energy Services, Inc., Houston, TX (US)

(72) Inventors: Ravikant S. Belakshe, Pune (IN); Pratiksha Shivaji Meher, Pune (IN); Larry Steven Eoff, Porter, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/771,756

(22) PCT Filed: Dec. 18, 2015

(86) PCT No.: PCT/US2015/066565
§ 371 (c)(1),
(2) Date: Apr. 27, 2018

(87) PCT Pub. No.: WO2017/105475
PCT Pub. Date: Jun. 22, 2017

(65) Prior Publication Data
US 2018/0346787 A1      Dec. 6, 2018

(51) Int. Cl.
*E21B 43/26* (2006.01)
*E21B 33/138* (2006.01)
(Continued)

(52) U.S. Cl.
CPC ............. *C09K 8/514* (2013.01); *C09K 8/035* (2013.01); *C09K 8/12* (2013.01); *C09K 8/50* (2013.01);
(Continued)

(58) Field of Classification Search
None
See application file for complete search history.

(56) References Cited

U.S. PATENT DOCUMENTS 3,929,741 A * 12/1975 Laskey ................... C08F 20/58
523/106
6,173,778 B1    1/2001 Rae et al.
(Continued)

OTHER PUBLICATIONS

Nasr-El-Din SPE 65017 (Nasr-El-Din, H. A., Fadhel, B. A., Al-Juaid, S. K., & Mohamed, S. K. (Jan. 1, 2001). Laboratory Evaluation of Biosealers. Society of Petroleum Engineers. doi:10.2118/65017-MS).*

(Continued)

*Primary Examiner* — Charles R Nold
(74) *Attorney, Agent, or Firm* — Thomas Rooney; C. Tumey Law Group PLLC

(57) ABSTRACT

Well treatments that use modified biopolymers for diversion, conformance, fluid loss control, and/or other well treatments, including a method of providing conformance, fluid loss control, or diversion in a subterranean formation, may include providing a treatment fluid including a base fluid and hydrogel particles which may include modified biopolymers that are crosslinked, the modified biopolymers may include a biopolymer backbone and side chains derived from synthetic monomers; and introducing the treatment fluid into a subterranean formation penetrated by a wellbore.

17 Claims, 5 Drawing Sheets

(51) Int. Cl.
*C09K 8/514* (2006.01)
*C09K 8/12* (2006.01)
*C09K 8/50* (2006.01)
*C09K 8/512* (2006.01)
*C09K 8/516* (2006.01)
*C09K 8/70* (2006.01)
*C09K 8/92* (2006.01)
*C09K 8/62* (2006.01)
*C09K 8/035* (2006.01)
*C09K 8/90* (2006.01)
*C09K 8/68* (2006.01)
*E21B 21/00* (2006.01)

(52) U.S. Cl.
CPC .............. *C09K 8/512* (2013.01); *C09K 8/516* (2013.01); *C09K 8/62* (2013.01); *C09K 8/685* (2013.01); *C09K 8/70* (2013.01); *C09K 8/905* (2013.01); *C09K 8/92* (2013.01); *E21B 21/003* (2013.01); *E21B 33/138* (2013.01); *E21B 43/26* (2013.01)

(56) References Cited

U.S. PATENT DOCUMENTS

| | | | |
|---|---|---|---|
| 6,186,231 | B1 | 3/2001 | Kalfoglu |
| 6,983,799 | B2 | 1/2006 | Reddy et al. |
| 7,316,275 | B2 | 1/2008 | Wang et al. |
| 7,897,546 | B2 | 3/2011 | Showalter et al. |
| 8,109,335 | B2 | 2/2012 | Luo et al. |
| 8,714,249 | B1 | 5/2014 | Tang |
| 2004/0244978 | A1* | 12/2004 | Shaarpour ............... C09K 8/516 166/293 |
| 2004/0261996 | A1 | 12/2004 | Kent et al. |
| 2006/0175090 | A1* | 8/2006 | Reitsma .................. E21B 21/08 175/25 |
| 2008/0058229 | A1* | 3/2008 | Berkland ............... C09K 8/706 507/211 |
| 2008/0085843 | A1 | 4/2008 | Wang et al. |
| 2009/0205829 | A1 | 8/2009 | Sullivan et al. |
| 2010/0038086 | A1 | 2/2010 | Bunnell et al. |
| 2010/0160488 | A1* | 6/2010 | Assmann ............... C08F 283/00 523/130 |
| 2010/0240802 | A1* | 9/2010 | Matzinger ............... C04B 24/14 523/130 |
| 2011/0245113 | A1* | 10/2011 | Phatak ..................... C09K 8/68 507/213 |
| 2011/0278011 | A1 | 11/2011 | Crainich et al. |
| 2012/0138303 | A1 | 7/2012 | Welton et al. |
| 2013/0081813 | A1 | 4/2013 | Liang et al. |
| 2014/0112964 | A1 | 4/2014 | Wu |
| 2015/0027710 | A1 | 1/2015 | Miller |
| 2017/0308054 | A1* | 10/2017 | Sarmiento-Klapper ..................... E21B 21/062 |

OTHER PUBLICATIONS

International Search Report and Written Opinion for PCT/US2015/066565 dated Sep. 12, 2016.
"Synthesis of pH-Sensitive Hydrogel Based on Starch-Polyacrylate Superabsorbent" Soleimani et al. dated 2012.
"Synthesis and super-swelling behavior of a novel low salt-sensitive protein-based superabsorbent hydrogel: Collagen-g-poly(AMPS)" Sadeghi et al. dated Oct. 2010.
BioVert Datasheet from Halliburtion Energy Services, Inc. dated Jun. 2011.
"Synthesis and characterization of poly(aspartic acid) composite hydrogels with inorganic MCM-41 cross-linker" Li et al. dated Nov. 15, 2014.
"Synthesis and Characterization of Chitosan-Based Novel Superabsorbent Hydrogel" Swain et al. Dated 2015.
"Designing of new acrylic based macroporous superabsorbent polymer hydrogel and its suitability for drug delivery" Gils et al. dated 2009.

* cited by examiner

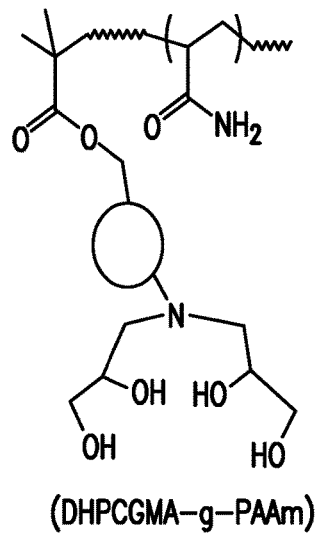
(DHPCGMA-g-PAAm)
FIG. 3
FIG. 4
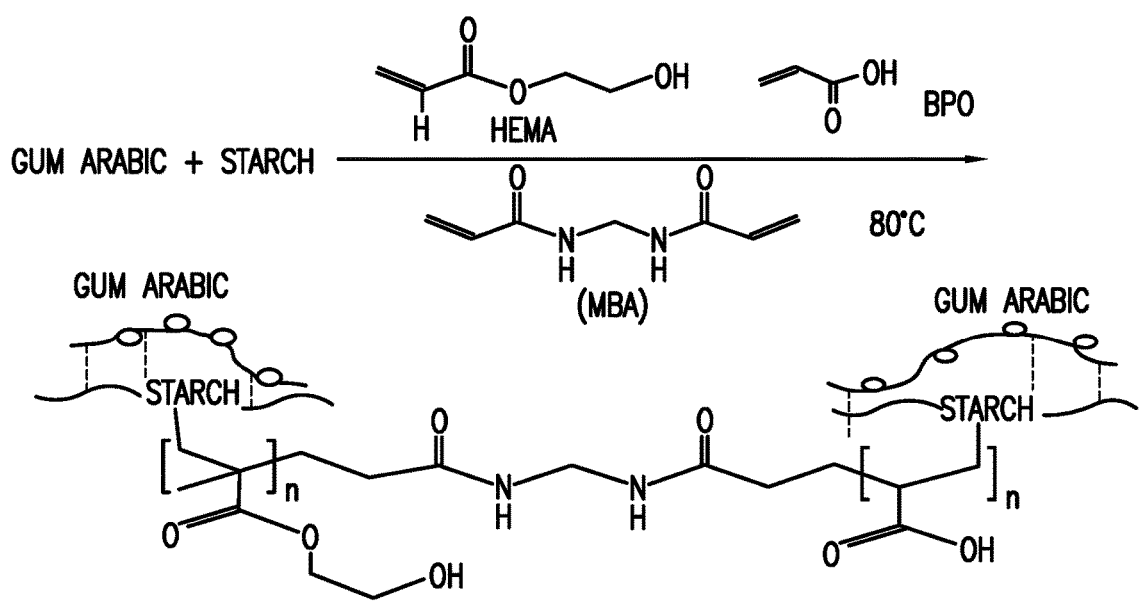

MODIFIED BIOPOLYMERS FOR DIVERSION, CONFORMANCE, AND FLUID LOSS CONTROL

BACKGROUND

The present disclosure relates to treatment of subterranean formations and, in specific examples, to methods, compositions, and systems that use modified biopolymers for diversion, conformance, fluid loss control, and/or other well treatments for controlling fluid flow in subterranean formations.

When hydrocarbons are produced from wells that penetrate hydrocarbon producing formations, water often accompanies the hydrocarbons, particularly as the wells mature in time. The water can be the result of a water-bearing zone communicated with the hydrocarbon producing formations or zones by fractures, high permeability streaks and the like, or the water can be caused by a variety of other occurrences which are well known to those skilled in the art, such as water coning, water cresting, bottom water, channeling at the wellbore, etc. As used herein, the term "zone" simply refers to a portion of the formation and does not imply a particular geological strata or composition. Over the life of such wells, the ratio of water to hydrocarbons recovered may be undesirable in view of the cost of producing the water, separating it from the hydrocarbons, and disposing it, which can represent a significant economic loss.

A variety of techniques have been used to reduce the production of undesired water. Generally, these techniques involve the placement of a material in a wellbore penetrating a water-zone portion of a subterranean formation that may prevent or control the flow of water into the wellbore. The techniques used to place these materials are referred to herein as "conformance techniques" or "conformance treatments." Some techniques involve the injection of particulates, foams, gels, sealants, resin systems, or blocking polymers (e.g., crosslinked polymer compositions) into the subterranean formation so as to plug off the water-bearing zones.

In addition to conformance treatments, additives may also be used to divert treatments fluids toward desired areas in the subterranean formation and/or control the loss of fluid into the subterranean formation. For example, it may be desirable to add a diverting agent toward the end of an operation treating a section of a subterranean formation that the agent may then slow or stop the flow of further treatment fluid into that area, thus diverting later-placed fluid to other areas. By way of further example, fluid loss control additives may be added to a treatment fluid that may reduce leak off of the treatment fluid.

Numerous additives are used in the art for conformance treatments, to help control fluid loss, or to divert treatment fluids in subterranean operations. However, the use of these conventional additives may give rise to other problems. In some instances, the additives used may be toxic and thus may harm the environment; this problem may be aggravated because many are poorly degradable or non-degradable within the environment. Due to environmental regulations, costly procedures often must be followed to dispose of the treatment fluids containing such compounds, ensuring that they do not contact the marine environment and groundwater. In addition, some known materials require hydrocarbon or acidic treatments to remove them from the formation after they are placed or require a high temperature for removal, or a large volume of under-saturated liquid (such as for the removal of salts) to be removed.

BRIEF DESCRIPTION OF THE DRAWINGS

These drawings illustrate certain aspects of some of the embodiments of the present invention, and should not be used to limit or define the invention.

FIG. 3 illustrates an example structure of a chitosan-glycidylmethacrylate-g-poly(acrylamide) hydrogel.

FIG. 4 is a schematic illustration of an example synthesis scheme for producing a starch-gum *Arabica* based hydrogel.

DETAILED DESCRIPTION

Figure 1:
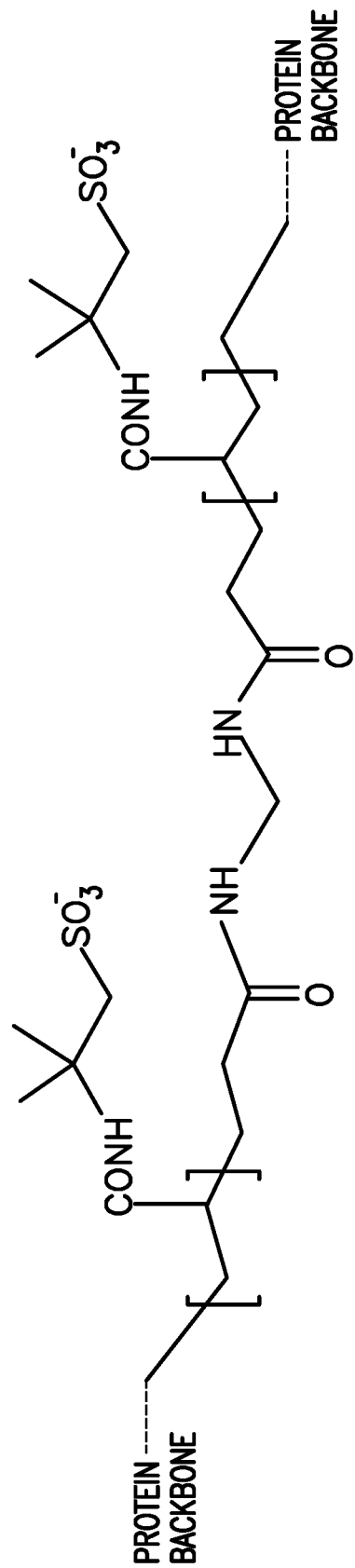
FIG. 1 illustrates an example structure of a crosslinked collagen-g-poly(2-acrylamido-2-methylpropanesulfonic-acid) hydrogel particles.

Provided herein are methods, compositions, and systems that use modified biopolymers for well treatments. Without limitation, the well treatments may include diversion, conformance, fluid loss control, and/or other well treatments where control of fluid flow in subterranean formations may be desired.

The well treatments may include placing hydrogel particles comprising a modified biopolymer that is crosslinked into a subterranean formation. In the subterranean formation, the hydrogel particles may swell to create a barrier to fluid flow. Without limitation, this barrier to fluid flow may be used, for example, in conformance applications to prevent the flow of water into the wellbore, in diversion to divert treatment fluids to another area, or in fluid loss control to reduce leak off into the subterranean formation. Advantageously, the hydrogel particles may exhibit high water absorption and swelling so may effectively seal water-producing zones in conformance treatments. Additionally, the hydrogel particles may swell at high pH values (e.g., 10 to 14) so can be used for fluid loss control in treatment fluids (e.g., drilling fluids, fracturing fluids, etc.) that are high pH. Even further, as the hydrogel particles may also swell at low pH values (e.g., 2 to 4), they may also be used in acid diversion applications.

The term "hydrogel particle(s)" as used herein refers to hydrogel in particulate form. Hydrogels are typically formed by crosslinking polymer chains and are well known for their ability to absorb water. Hydrogels are widely used in absorbent articles, such as disposable diapers, sanitary napkins, and the like, where their ability to absorb water may be beneficial. The hydrogel particles may be any suitable size. Without limitation, the hydrogel particles may have an average particle size in the range of about 5 microns to about 4,000 microns or from about 5 microns to about 1,500 microns or from about 20 microns to about 200 microns. However, average particle sizes outside these disclosed ranges may also be suitable for particular applications. As used herein, the term "average particle size" refers to volume mean diameter. Even further, the hydrogel particles may have any suitable shape, including, but not limited to, platelets, shavings, fibers, flakes, ribbons, rods, spheroids, toroids, pellets, tablets, and other suitable physical shapes. The hydrogel particles may have a well-defined physical shape and/or an irregular geometry.

The hydrogel particles may be considered a superabsorbent material that can absorb and retain up to a minimum of its own weight in water. Without limitation, the hydrogel particles may be capable of absorbing a minimum of one time, five times, twenty times, or one hundred times its own weight in water. In some embodiments, the hydrogel particles may absorb 1,000 times or even 2,000 times its own weight. Absorbency may be defined under standard ambient temperature (e.g., 77° F.) and pressure (1 atmosphere) in distilled water.

The hydrogel particles may comprise modified biopolymers that are crosslinked. Without limitation, the modified biopolymers may comprise a biopolymer backbone and synthetic side chains. The biopolymer backbone may comprise any suitable biopolymer including natural, modified, and derivatized polysaccharides and proteins of amino acids. Without limitation, examples of suitable biopolymers may include xanthan, diutan, guar gum, galactomannan gum, cellulose, starch, chitosan, collagen, gelatin, agarose, chitin, polyaspartic acid, pectin, dextran, gum *arabica*, alginate, carrageenan, polylactide, poly-caprolactone, polyglycolide, polyhydroxybutyrate, lignin, lignosulfonates, derivatives thereof, and combinations thereof.

The synthetic side chains of the modified biopolymer may be derived from any of a variety of suitable synthetic materials, including synthetic monomers and polymers. Synthetic side chains may be desirable that may be swellable, provide hardness to the modified biopolymer upon grafting and crosslinking, and/or can enhance thermal stability of the modified biopolymer. Without limitation, examples of suitable synthetic monomers may include silanes such as hydroxy-alkoxy silanes, acrylates, methacrylates, acrylamide, methacrylamide, acrylic acid, acrylamido- and methacrylamido-sulfonic acids and sulfonates such as 2-acrylamido-2-methylpropanesulfonic acid, among others. Combinations of synthetic monomers may also be used. Suitable hydroxy-alkoxy silanes may include, but are not limited to, triethoxy silane, trimethoxy silane, tripropoxy silane, tributoxy silane, methyl dimethoxy silane, ethyl dimethoxy silane, methyl diethoxy silane, dimethyl methoxy silane, trioctyloxy silane, methyl dioctyloxy silane and dimethyloctyloxy silane. One specific example of a suitable hydroxy-alkoxy silane is gamma-aminopropyltriethoxysilane. Additional examples may include 2,aminoethyl-aminopropyl-trimethoxy silane; 2,a'minoethyl-aminopropyl-tripropylene oxide silane; 2, a'minoethyl-aminopropyl-triethylene oxide silane; 2,aminomethyl-aminopropyl-trimethoxy silane; 2,aminopropylaminopropyl-trimethoxy silane; 1,trimethoxy-2,aminoethyl-2,aminopropyl disilane; 1,triethylene oxide-2,aminoethyl-2,-aminopropyl disilane; 1,tripropylene oxide-2, aminoethyl-2, aminopropyl disilane; 1,trimethoxy-2, aminomethyl-2, aminopropyl disilane; 1,trimethoxy-2,aminopropyl-2,aminopropyl disilane; and 1,trimethoxy-2, aminoethyl-2, aminoethyl disilane. Suitable acrylates and methacrylates may include an acrylic moiety, such as glycidyl ether acrylate and glycidyl ether methacrylate. Suitable acrylates and methacrylates may also include hydroxyalkyl acrylates and hydroxyalkyl methacrylates. One specific example of a suitable hydroxyalkyl methacrylate may include 2-hydroxy ethyl methacrylate. Suitable acrylamides may include n-isopropylacrylamide and hydroxymethylacrylamide. As will be appreciated, polymers of the synthetic monomers listed herein (or other synthetic monomers) may also be used in preparation of the synthetic side chains.

Optionally, a mesoporous molecular sieve may be also grafted onto the biopolymer in addition to the synthetic side chains derived from synthetic monomers to forth a mesoscopically structured composite. Suitable examples of mesoporous molecular sieves may include a mesoporous form of silica, such as mesoporous silica nanoparticles. An example of suitable mesoporous silica nanoparticles is commonly referred to as MCM-41.

Any of a variety of suitable crosslinkers may be used for forming the modified biopolymer that is crosslinked. Without limitation, a suitable crosslinker may comprise a bisacrylamide. Non-limiting examples of suitable bisacrylamides may include bisacrylamides of primary or secondary amines, such as N,N'-methylenebisacrylamide (MBA), N,N'-ethylenebisacrylamide, bis-acryloylpiperazine and bis-acryloylcystamine (CH2=CH— (C=O)—NH—S—S—NH—(C=O)—CH=CH2). Additional examples of suitable crosslinkers may include N,N'-polyoxyalkylen-bisacrylamide or N,N'-polyoxyalkylen-bisacrylamide.

Without limitation, a suitable modified biopolymer may comprise a collagen backbone and synthetic side chains derived from acrylamido-sulfonic acids, acrylamido-sulfonates, methacrylamido-sulfonic acids, or methacrylamido sulfonates. By way of example, modified biopolymers may comprise a collagen backbone grafted with synthetic side chains derived from 2-acrylamido-2-methylpropanesulfonic acid, also referred to as a collagen-g-poly (2-acrylamido-2-methylpropanesulfonic acid). The collagen-g-poly(2-acrylamido-2-methylpropanesulfonic acid) may be a low-salt-sensitive superabsorbent as it may continue to exhibit absorbency in salt solutions. Any of a variety of suitable techniques may be used for preparing this modified biopolymer. Without limitation, a collagen-g-poly(2-acrylamido-2-methylpropanesulfonic acid) may be obtained through graft copolymeriziation of the 2-acrylamido-2-methylpropanesulfonic acid monomer onto a collagen biopolymer using ammonium persulfate as a free radical initiator in the presence of methylene bisacrylamide. An example structure of the collagen-g-poly(2-acrylamido-2-methylpropanesulfonic acid) is provided in FIG. 1.

Without limitation, another suitable modified biopolymer may comprise a poly aspartic acid backbone grafted with synthetic side chains derived from a hydroxy-alkoxy silane, such as those mentioned above. By way of example, modified biopolymers may comprise a polyaspartic acid backbone grafted with synthetic side chains derived from gamma-aminopropyltriethoxysilane. The modified biopolymers may be further grafted with a mesoporous molecular sieve, such as mesoporous silica nanoparticles (e.g., MCM-41). This example may be considered a composite biopolymer. The composite biopolymer may be prepared, for example, by grafting a poly(aspartic acid) biopolymer with γ-aminopropyltriethoxysilane and the mesoporous molecular sieve in an aqueous solution via cross-linking. An example reaction mechanism is provided in FIG. 2.

Without limitation, another suitable modified biopolymer may comprise a chitosan-based biopolymer. Suitable chitosans may include hydroxyalkyl chitosans, such as hydroxyethyl chitosan, hydroxypropyl chitosan, and hydroxybutyl chitosan, hydroxybutyl chitosan, hydroxypropyl chitosan and glyceryl chitosan. Suitable chitosan-based bio-polymers may have synthetic side chains derived from acrylates and methacrylates that may include an acrylic moiety, such as glycidyl ether acrylate and glycidyl ether methacrylate. The chitosan-based biopolymers may further have synthetic side chains derived from acrylamide. One particular chitosan-based biopolymer may comprise glyceryl chitosan (DHPC) grafted with synthetic side chains derived from glycidyl methacrylate and acrylamide. This chitosan-based biopolymer may be referred to as a glyceryl-chitosan-glycidyl-methacrylate-g-polyacrylamide. An example structure of the glyceryl-chitosan-glycidyl-methacrylate-g-polyacrylamide is provided in FIG. 3.

Without limitation, another suitable modified biopolymer may comprise a starch grafted with synthetic side chains derived from hydroxyalkyl acrylates and an acrylic acid. Any of a variety of suitable techniques may be used for preparing this modified biopolymer. Without limitation, a hydroxyalkyl acrylate (e.g., 2-hydroxy ethyl methacrylate (HEMA)) and acrylic acid may be grafted onto starch in the presence of gum *arabica*. N—N'-methylene-bis-acrylamide (MBA) may be used as a crosslinker and benzoyl peroxide (BPO) may be used as an initiator. An example illustration of this synthesis technique is provided in FIG. 4.

The hydrogel particles may be placed into a subterranean formation by introducing a treatment fluid comprising the hydrogel particles into a subterranean formation. As used herein the term "treatment," or "treating," is not intended to imply any particular action by the fluid. Generally, the hydrogel particles may be included in the treatment fluid in an amount suitable for a particular application, including without limitation in an amount in a range from about 0.1% to about 20%, or from about 1% to about 5%, or from about 3% to about 4% by weight of the treatment composition. By way of example, the hydrogel particles may be present in an amount of about 0.1%, about 1%, about 5%, about 10%, about 15%, or about 20%, or about 50% by weight of the treatment composition. One of ordinary skill in the art with the benefit of this disclosure should be to select an appropriate type and amount of hydrogel particles for a particular application.

The treatment fluid may comprise a base fluid, which may be aqueous or non-aqueous. Suitable non-aqueous fluids may include one or more organic liquids, such as hydrocarbons (e.g., kerosene, xylene, toluene, or diesel), oils (e.g., mineral oils or synthetic oils), esters, and the like. Suitable base fluids may comprise, without limitation, freshwater, saltwater, brine, seawater, or any other suitable base fluids that preferably do not undesirably interact with the other components used in the sealant composition. In some embodiments, the base fluid may be an aqueous salt solution. Such aqueous salt solutions can have a salt concentration ranging between about 0.1% and about 10% by weight. Without limitation, the salt concentration may be between about 1% and about 10% by weight or between about 2% and about 5%. The salt of such aqueous salt solutions may comprise an alkali metal or alkaline earth metal salt. Illustrative alkali metal salts may include, for example, LiF, LiCl, LiBr, LiI, NaF, NaCl, NaBr, NaI, KF, KCl, KBr, KI, RbF, RbCl, RbBr, RbI, CsF, CsCl, CsBr, and CsI. Illustrative alkaline earth metal salts may include, for example, CaCl2, CaBr2, CaI2, MgCl2, MgBr2, MgI2, SrCl2, SrBr2, SrI2, BaCl2, BaBr2, and BaI2. Other alkali metal or alkaline earth metal salts such as, for example, nitrates, acetates, and soluble formates can also be used for forming the aqueous salt solution Optionally, the base fluid may be an aqueous acid solution. Illustrative aqueous acid solutions may include one or more acids, such as hydrochloric acid, hydrofluoric acid, acetic acid, or formic acid, among others. Other organic acids may also be suitable. Aqueous acid solutions may be used in acidizing treatments, for example, to increase the permeability of producing zones.

Depending on the treatment, the treatment fluids optionally may comprise any number of additional additives, including, but not limited to, surfactants, fluid loss control additives, gas, nitrogen, carbon dioxide, tackifying agents, foamers, corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, viscosifiers, breakers, weighting agents, relative permeability modifiers, resins, particulate materials (e.g., proppant particulates such as sand or ceramic particles), wetting agents, coating enhancement agents, and the like. A person skilled in the art, with the benefit of this disclosure, should recognize the types of additives that may be included in the treatment compositions for a particular application.

In addition, the pH of the treatment fluid may also depend on the particular treatment. Treatments fluids with a high pH (e.g., 10 to 14) may be used, and treatment fluids with a low pH (e.g., <4) may also be used. Treatment fluids with a low pH may be used, for example, in acidizing treatments with a base fluid that is an aqueous acid solution. Because the hydrogel particles may swell at high pH values (e.g., 10 to 14), they may be used in treatment fluids such as fracturing and drilling fluids that may have a high pH. Additionally, because the hydrogel particles may also swell at low pH values (2 to 4), they may also be used in acidizing treatments, for example, in the diversion of acidizing treatment fluids.

As previously described, the hydrogel particles may swell in the subterranean formation, e.g., by absorbing water, to create a barrier to fluid flow. Without limitation, this barrier to fluid flow may be used, for example, in conformance applications to prevent the flow of water into the wellbore, in diversion to divert treatment fluids to another area, in fluid loss control to reduce leak off into the subterranean formation. The fluid flow preventing barrier may be formed in the subterranean formation to block certain flow paths in the subterranean formation, reducing the flow of fluids through the subterranean formation, especially the flow of aqueous fluids. Examples of the types of flow paths that may be blocked by the fluid flow preventing barrier include, but are not limited to, perforations, such as those formed by a perforation gun, fissures, cracks, fractures, streaks, flow channels, voids, high permeable streaks, annular voids, or combinations thereof, as well as any other zone in the formation through which fluids may undesirably flow.

As will be appreciated by those of ordinary skill in the art, the hydrogel particles may be used in a variety of subterranean operations, where formation of a fluid flow diverting (or flow preventing) barrier may be desired, such as conformance treatments, fluid diversion, and fluid loss control. Fluid loss control may be desired in a number of subterranean treatments, including, without limitation, drilling operations, fracturing operations, acidizing operations, and gravel packing operations. Fluid diversion may be desired in a number of subterranean treatments, including acidizing. The hydrogel particles may be used prior to, during, or subsequent to a variety of subterranean operations. The hydrogel particles may swell in the subterranean formation due to contact with water in the treatment fluid in which they are placed, a subsequently introduced treatment fluid, and/or water present in the subterranean formation. Methods of using the hydrogel particles may first include preparing a treatment fluid comprising the hydrogel particles. The treatment fluids may be prepared in any suitable manner, for example, by combining the hydrogel particles, base fluid, and any of the additional components described herein in any suitable order.

Methods may include introduction of the hydrogel particles into a subterranean formation. Introduction into the subterranean formation is intended to include introduction into a wellbore penetrating a subterranean formation, introduction into the zone(s) surrounding the wellbore, or both. A treatment fluid containing the hydrogel particles may dissipate into the subterranean formation through openings, which may be naturally occurring (e.g., pores, cracks, fractures, fissures, etc.) or man-made. As the treatment fluid dissipates into the subterranean formation, the hydrogel particles may be screened out by the formation, whereby the hydrogel particles may be packed into the openings. In the subterranean formation, the hydrogel particles may absorb water to form a flow preventing barrier that blocks certain flow paths therein, reducing the flow of fluids through the subterranean formation. Examples of the types of flow paths that may be blocked by the gel network include, but are not limited to, perforations, such as those formed by a perforation gun, fissures, cracks, fractures, streaks, flow channels, voids, high permeable streaks, annular voids, or combinations thereof, as well as any other zone in the formation through which fluids may undesirably flow. Methods may further include selecting one or more zones of the subterranean formation for conformance control in which the hydrogel particles may be introduced.

The hydrogel particles may be used as diverting agents or fluid loss control agents, among others. Providing effective fluid loss control for subterranean treatment fluids is highly desirable. "Fluid loss," as that term is used herein, refers to the undesirable migration or loss of fluids (such as the fluid portion of a drilling mud or cement slurry) into a subterranean formation and/or a proppant pack. Treatment fluids may be used in any number of subterranean operations, including drilling operations, fracturing operations, acidizing operations, gravel-packing operations, acidizing operations, well bore clean-out operations, and the like. Fluid loss may be problematic in any number of these operations. In fracturing treatments, for example, fluid loss into the formation may result in a reduction in fluid efficiency, such that the fracturing fluid cannot propagate the fracture as desired. Fluid loss control materials are additives that lower the volume of a filtrate that passes through a filter medium. That is, they block the pore throats and spaces that otherwise allow a treatment fluid to leak out of a desired zone and into an undesired zone. Particulate materials may be used as fluid loss control materials in subterranean treatment fluids to fill/bridge the pore spaces in a formation matrix and/or proppant pack and/or to contact the surface of a formation face and/or proppant pack, thereby forming a type of filter cake that blocks the pore spaces in the formation or proppant pack, and prevents fluid loss therein. Without limitation, when the hydrogel particles may be used as a fluid loss control agent, it may be used in conjunction with a fracturing or drilling operation. For example, the hydrogel particles may be included in a treatment fluid that is then placed into the portion of the subterranean formation at a pressure/rate sufficient to create or extend at least one fracture in that portion of the subterranean formation. The hydrogel particles may swell in the subterranean formation due to contact with water in the treatment fluid.

Diverting agents have similar actions but strive for a somewhat different approach. Diverting agents may be used to seal off a portion of the subterranean formation. By way of example, in order to divert a treatment fluid from permeable portions of the formation into the less permeable portions of the formation, a volume of treatment fluid may be pumped into the formation followed by a diverting material to seal off a portion of the formation where the first treatment fluid penetrated. After the diverting material is placed, a second treatment fluid may be placed wherein the second treatment will be diverted to a new zone for treatment by the previously placed diverting agent. When being placed, the treatment fluid containing the diverting agent will flow most readily into the portion of the formation having the largest pores, fissures, or vugs, until that portion is bridged and sealed, thus diverting the remaining fluid to the next most permeable portion of the formation. These steps may be repeated until the desired number of stages of treating fluid has been pumped. Without limitation, when used as diverting agents, the hydrogel particles may be included in treatment fluids introduced at matrix flow rates; that is, flow rates and pressures that are below the rate/pressure sufficient to create or extend fractures in that portion of a subterranean formation. The hydrogel particles may swell in the subterranean formation due to contact with water in the treatment fluid, a subsequently introduced treatment fluid, or water present in the subterranean formation.

Plugging agents are similar to diverting agents in that they may form a barrier to fluid flow in the subterranean formation. In conformance treatments, diverting agents may be placed into a subterranean formation to stop or reduce fluid through the treated section. In this manner, the undesired flow of water through the subterranean formation may be controlled. Without limitation, when used as plugging agents, the hydrogel particles may be included in treatment fluids introduced at matrix flow rates; that is, flow rates and pressures that are below the rate/pressure sufficient to create or extend fractures in that portion of a subterranean formation. The hydrogel particles may swell in the subterranean formation due to contact with water in the treatment fluid, a subsequently introduced treatment fluid, or water present in the subterranean formation.

Removal of the hydrogel particles, if desired, may be effected by any number of suitable treatments. Because the hydrogel particles include a biopolymer backbone, they may be removed by acid/base hydrolysis and/or by contact with oxidizers. Removal may include contacting the hydrogel particles with an oxidizer, such as persulfate, alkali metal chlorite or hypochlorite, peroxides, ammonium or metal chlorate, bromate, iodates or perchlorate, perbromate, periodate. Without limitation, specific examples of suitable oxidizers may include sodium persulfate, ammonium persulfate, potassium persulfate, lithium hypochlorite, or sodium hypochlorite, calcium hypochlorite, sodium chlorate, sodium bromate, sodium iodate, sodium perchlorate, sodium perbromate, sodium periodate, potassium chlorate, potassium bromate, potassium iodate, potassium perchlorate, potassium perbromate, potassium periodate, ammonium chlorate, ammonium bromate, ammonium iodate, ammonium perchlorate, ammonium perbromate, ammonium periodate, magnesium chlorate, magnesium bromate, magnesium iodate, magnesium perchlorate, magnesium perbromate, magnesium periodate, zinc chlorate, zinc bromate, zinc iodate, zinc perchlorate, zinc perbromate, zinc periodate, sodium perborate, t-butyl hydroperoxide, or combinations thereof. The oxidizer may be introduced into the formation by way of the wellbore. Without limitation, the modified biopolymers may be susceptible to hydrolysis by acids so the modified biopolymer may be contacted by an acid in the subterranean formation, for example, to break down the biopolymer backbone. In addition, certain of the modified biopolymers may be susceptible to base hydrolysis so may be contacted with a base on the subterranean formation for removal.

Accordingly, this disclosure describes systems, compositions, and methods that may use modified biopolymers for diversion, conformance, fluid loss control, and/or other well treatments for controlling fluid flow in subterranean formations. A method of providing conformance, fluid loss control, or diversion in a subterranean formation may comprise providing a treatment fluid comprising a base fluid and hydrogel particles, wherein the hydrogel particles comprise modified biopolymers that are crosslinked, the modified biopolymers comprising a biopolymer backbone and synthetic side chains; and introducing the treatment fluid into a subterranean formation penetrated by a wellbore.

This method of providing conformance, fluid loss control, or diversion in a subterranean formation may include any of the various features of the compositions, methods, and systems disclosed herein. Without limitation, this method may comprise allowing the hydrogel particles to degrade over time in the subterranean formation. This method may further comprise forming a barrier comprising the hydrogel particles in the subterranean formation, wherein the barrier reduces flow of fluid through in the subterranean formation, reduces fluid loss from the treatment fluid or another treatment fluid introduced into the wellbore, and/or diverts a treatment fluid subsequently introduced into the wellbore to another portion of the subterranean formation. This method may further comprise contacting the hydrogel particles in the subterranean formation with an oxidizer. This method may further comprise wherein the base fluid comprises an aqueous salt solution having a salt concentration from about 0.1% to about 10% by weight. This method may further comprise wherein the base fluid comprises an aqueous salt solution comprising an acid. This method may further comprise wherein the treatment fluid has a pH of from about 8 to about 12. This method may further comprise wherein the treatment fluid is a drilling fluid circulated into a wellbore through a drill bit. This method may further comprise wherein the treatment fluid is a fracturing fluid introduced into the subterranean formation above a fracturing pressure. This method may further comprise wherein the biopolymer backbone comprises a collagen backbone, and wherein the synthetic side chains are derived from synthetic monomers selected from the group consisting of acrylamidosulfonic acids, acrylamide-sulfonates, methacrylamido-sulfonic acids, methacrylamido sulfonates, and combinations thereof. This method may further comprise wherein the biopolymer backbone comprises a polyaspartic acid, and wherein the synthetic side chains are derived synthetic monomers that comprise a hydroxyl-alkoxy silane, wherein the biopolymer backbone is further grafted with a mesoporous molecular sieve. This method may further comprise wherein the biopolymer backbone comprises a hydroxyalkyl chitosan, and wherein the synthetic side chains are derived from synthetic monomers that comprise acrylic or methacrylate with an acrylic moiety. This method may further comprise wherein the biopolymer backbone comprises a starch, and wherein the synthetic side chains are derived synthetic monomers that comprise a hydroxyalkyl acrylate and acrylic acid, wherein the synthetic monomers are grafted onto the starch in the presence of bum *Arabica*.

Without limitation, a treatment fluid may be provided that comprises a base fluid; and hydrogel particles, wherein the hydrogel particles comprise modified biopolymers that are crosslinked, the modified biopolymers comprising a biopolymer backbone and synthetic side chains derived from synthetic monomers. This treatment fluid may include any of the various features of the compositions, methods, and systems disclosed herein. Without limitation, the base fluid may comprise an aqueous salt solution having a salt concentration from about 0.1% to about 10% by weight. The base fluid may comprise an aqueous salt solution comprising an acid. The treatment fluid may have a pH of from about 8 to about 12. The treatment fluid may be a drilling fluid or a fracturing fluid. The base fluid may be aqueous or non-aqueous. The biopolymer backbone may comprise a collagen backbone, and wherein the synthetic side chains may be derived from synthetic monomers selected from the group consisting of acrylamidosulfonic acids, acrylamide-sulfonates, methacrylamido-sulfonic acids, methacrylamido sulfonates, and combinations thereof. The biopolymer backbone may comprise a polyaspartic acid, and wherein the synthetic side chains may be derived synthetic monomers that comprise a hydroxyl-alkoxy silane, wherein the biopolymer backbone is further grafted with a mesoporous molecular sieve. The biopolymer backbone may comprise a hydroxyalkyl chitosan, and wherein the synthetic side chains may be derived from synthetic monomers that comprise acrylic or methacrylate with an acrylic moiety. The biopolymer backbone may comprise a starch, and wherein the synthetic side chains may be derived synthetic monomers that comprise a hydroxyalkyl acrylate and acrylic acid, wherein the synthetic monomers may be grafted onto the starch in the presence of bum *Arabica*.

Without limitation, a well system may be provided that comprises a treatment fluid comprising a base fluid and hydrogel particles, wherein the hydrogel particles comprise modified biopolymers that are crosslinked, the modified biopolymers comprising a biopolymer backbone and synthetic side chains derived from synthetic monomers; a fluid handling system comprising the treatment fluid; and a conduit fluidically coupled to the fluid handling system and a wellbore. This well system may include any of the various features of the compositions, methods, and systems disclosed herein. Without limitation, the fluid handling system may comprise a fluid supply and pumping equipment. The base fluid may comprise an aqueous salt solution having a salt concentration from about 0.1% to about 10% by weight. The base fluid may comprise an aqueous salt solution comprising an acid. The treatment fluid may have a pH of from about 8 to about 12. The treatment fluid may be a drilling fluid or a fracturing fluid. The base fluid may be aqueous or non-aqueous. The biopolymer backbone may comprise a collagen backbone, and wherein the synthetic side chains may be derived from synthetic monomers selected from the group consisting of acrylamidosulfonic acids, acrylamide-sulfonates, methacrylamido-sulfonic acids, methacrylamido sulfonates, and combinations thereof. The biopolymer backbone may comprise a polyaspartic acid, and wherein the synthetic side chains may be derived synthetic monomers that comprise a hydroxyl-alkoxy silane, wherein the biopolymer backbone is further grafted with a mesoporous molecular sieve. The biopolymer backbone may comprise a hydroxyalkyl chitosan, and wherein the synthetic side chains may be derived from synthetic monomers that comprise acrylic or methacrylate with an acrylic moiety. The biopolymer backbone may comprise a starch, and wherein the synthetic side chains may be derived synthetic monomers that comprise a hydroxyalkyl acrylate and acrylic acid, wherein the synthetic monomers may be grafted onto the starch in the presence of bum *Arabica*.

Figure 5:
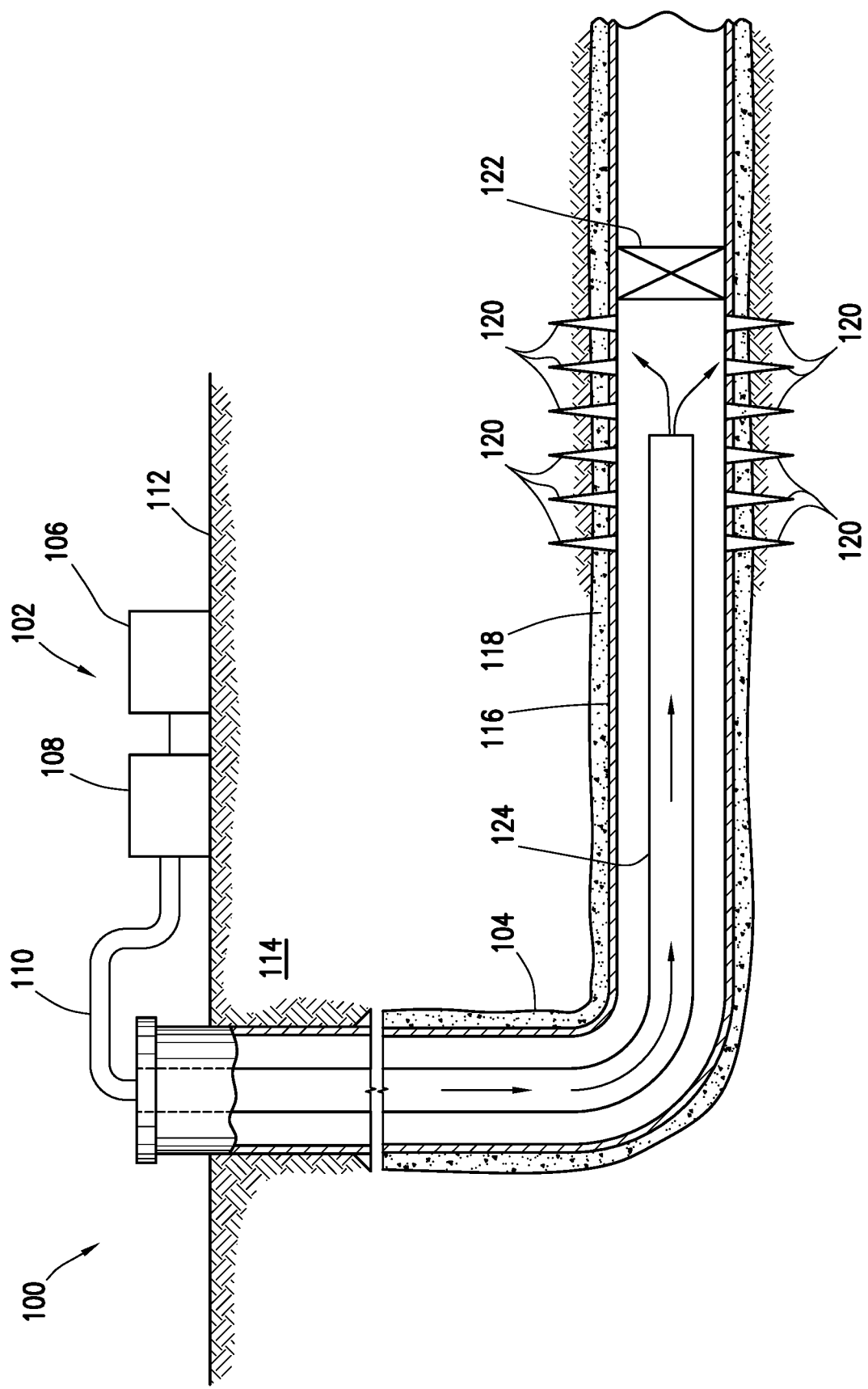
FIG. 5 is a schematic illustration of example well system showing placement of a treatment into a wellbore.

Example methods of using the hydrogel particles will now be described in more detail with reference to FIG. 5. Any of the previous examples of the hydrogel particles may apply in the context of FIG. 5. FIG. 5 illustrates an example well system 100 that may be used for preparation and delivery of a treatment fluid downhole. It should be noted that while FIG. 5 generally depicts a land-based operation, those skilled in the art will readily recognize that the principles described herein are equally applicable to subsea operations that employ floating or sea-based platforms and rigs, without departing from the scope of the disclosure.

Figure 2:
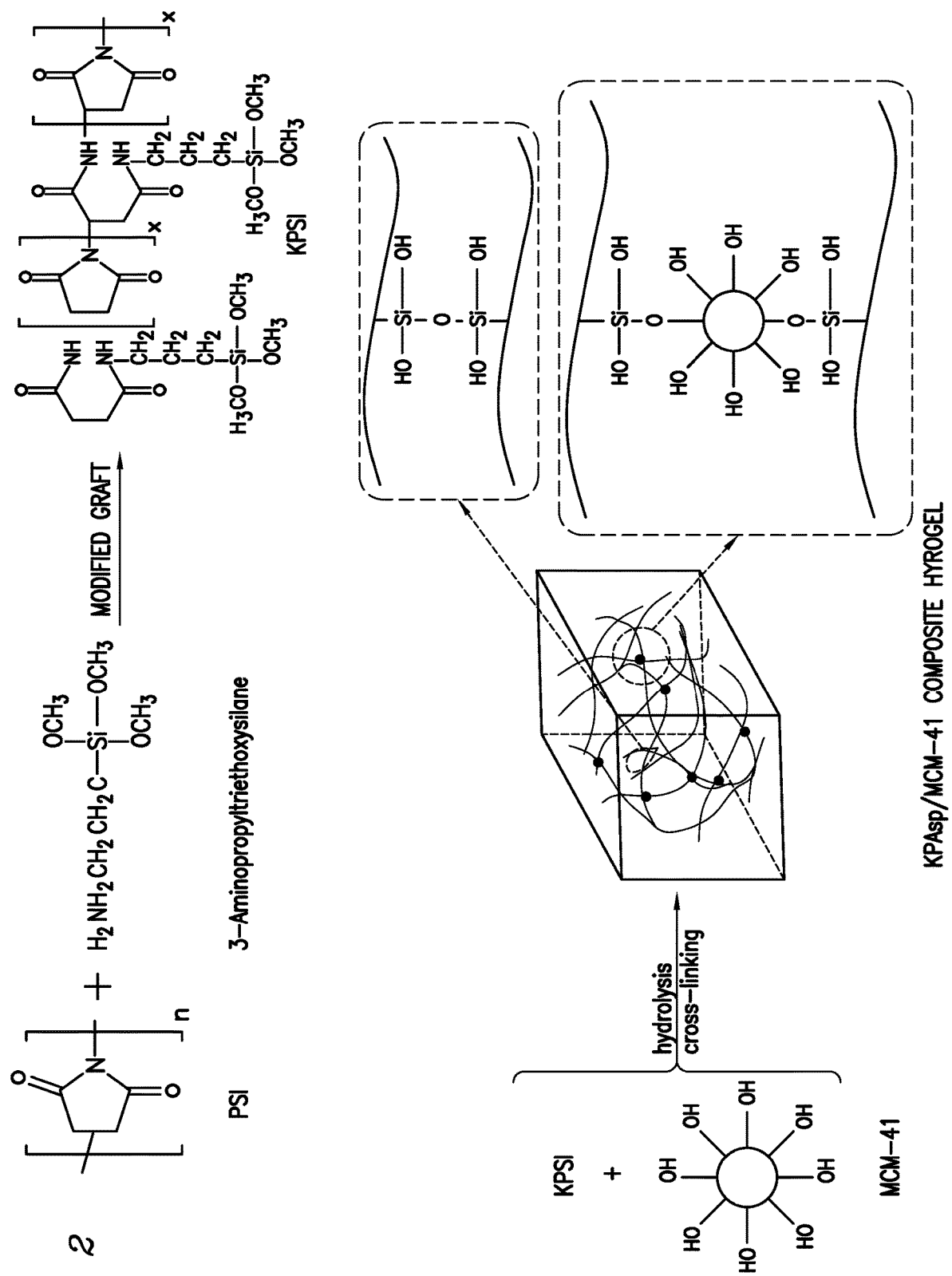
FIG. 2 is a schematic illustration of an example synthesis scheme for producing hydrogel particles comprising poly (aspartic acid) grafted with γ-aminopropyltriethoxysilane and a mesoporous molecular sieve.

Referring now to FIG. 5, a fluid handling system 102 is illustrated. The fluid handling system 102 may be used for preparation of a treatment fluid comprising treated additive particles and for introduction of the treatment fluid into a wellbore 104. The fluid handling system 102 may include mobile vehicles, immobile installations, skids, hoses, tubes, fluid tanks or reservoirs, pumps, valves, and/or other suitable structures and equipment. As illustrated, the fluid handling system 102 may comprise a fluid supply vessel 106, pumping equipment 108, and wellbore supply conduit 110. While not illustrated, the fluid supply vessel 106 may contain one or more components of the treatment fluid (e.g., treated additive particles, base fluid, etc.) in separate tanks or other containers that may be mixed at any desired time. Pumping equipment 108 may be fluidically coupled with the fluid supply vessel 106 and wellbore supply conduit 110 to communicate the treatment fluid into wellbore 104. Fluid handling system 102 may also include surface and downhole sensors (not shown) to measure pressure, rate, temperature and/or other parameters of treatment. Fluid handling system 102 may also include pump controls and/or other types of controls for starting, stopping, and/or otherwise controlling pumping as well as controls for selecting and/or otherwise controlling fluids pumped during the injection treatment. An injection control system may communicate with such equipment to monitor and control the injection of the treatment fluid. As depicted in FIG. 5, the fluid supply vessel 106 and pumping equipment 108 may be above the surface 112 while the wellbore 104 is below the surface 112. As will be appreciated by those of ordinary skill in the art, well system 200 may be configured as shown in FIG. 2 or in a different manner, and may include additional or different features as appropriate. By way of example, fluid handling system 102 may be deployed via skid equipment, marine vessel, or may be comprised of sub-sea deployed equipment.

Without continued reference to FIG. 2, well system 200 may be used for introduction of a treatment fluid into wellbore 104. The treatment fluid may contain a base fluid (which may be oil- or aqueous-based) and hydrogel particles, described herein. Generally, wellbore 104 may include horizontal, vertical, slanted, curved, and other types of wellbore geometries and orientations. Without limitation, the treatment fluid may be applied through the wellbore 104 to subterranean formation 114 surrounding any portion of wellbore 104. As illustrated, the wellbore 104 may include a casing 116 that may be cemented (or otherwise secured) to wellbore wall by cement sheath 118. Perforations 120 allow the treatment fluid and/or other materials to flow into and out of the subterranean formation 114. A plug 122, which may be any type of plug (e.g., bridge plug, etc.) may be disposed in wellbore 104 below the perforations 120 if desired. While FIG. 5 illustrates used of treatment fluid in a cased section of wellbore 104, it should be understood that treatment fluid may also be used in portions of wellbore 104 that are not cased.

The treatment fluid comprising the hydrogel particles may be pumped from fluid handling system 102 down the interior of casing 116 in wellbore 104. As illustrated, well conduit 124 (e.g., coiled tubing, drill pipe, etc.) may be disposed in casing 116 through which the treatment fluid may be pumped. The well conduit 124 may be the same or different than the wellbore supply conduit 110. For example, the well conduit 124 may be an extension of the wellbore supply conduit 110 into the wellbore 104 or may be tubing or other conduit that is coupled to the wellbore supply conduit 110. The treatment fluid may be allowed to flow down the interior of well conduit 124, exit the well conduit 124, and finally enter subterranean formation 114 surrounding wellbore 104 by way of perforations 120 through the casing 116 (if the wellbore is cased as in FIG. 2) and cement sheath 118. Without limitation, the treatment fluid may be introduced into subterranean formation 114 whereby one or more fractures (not shown) may be created or enhanced in subterranean formation 114. For example, the treatment fluid may be introduced into subterranean formation 114 at or above fracturing pressure. Without limitation, at least a portion of the hydrogel particles may be deposited in the subterranean formation 114. As previously described, the hydrogel particles may absorb water and swell such that fluid flow in the subterranean formation 114 may be reduced.

Figure 6:
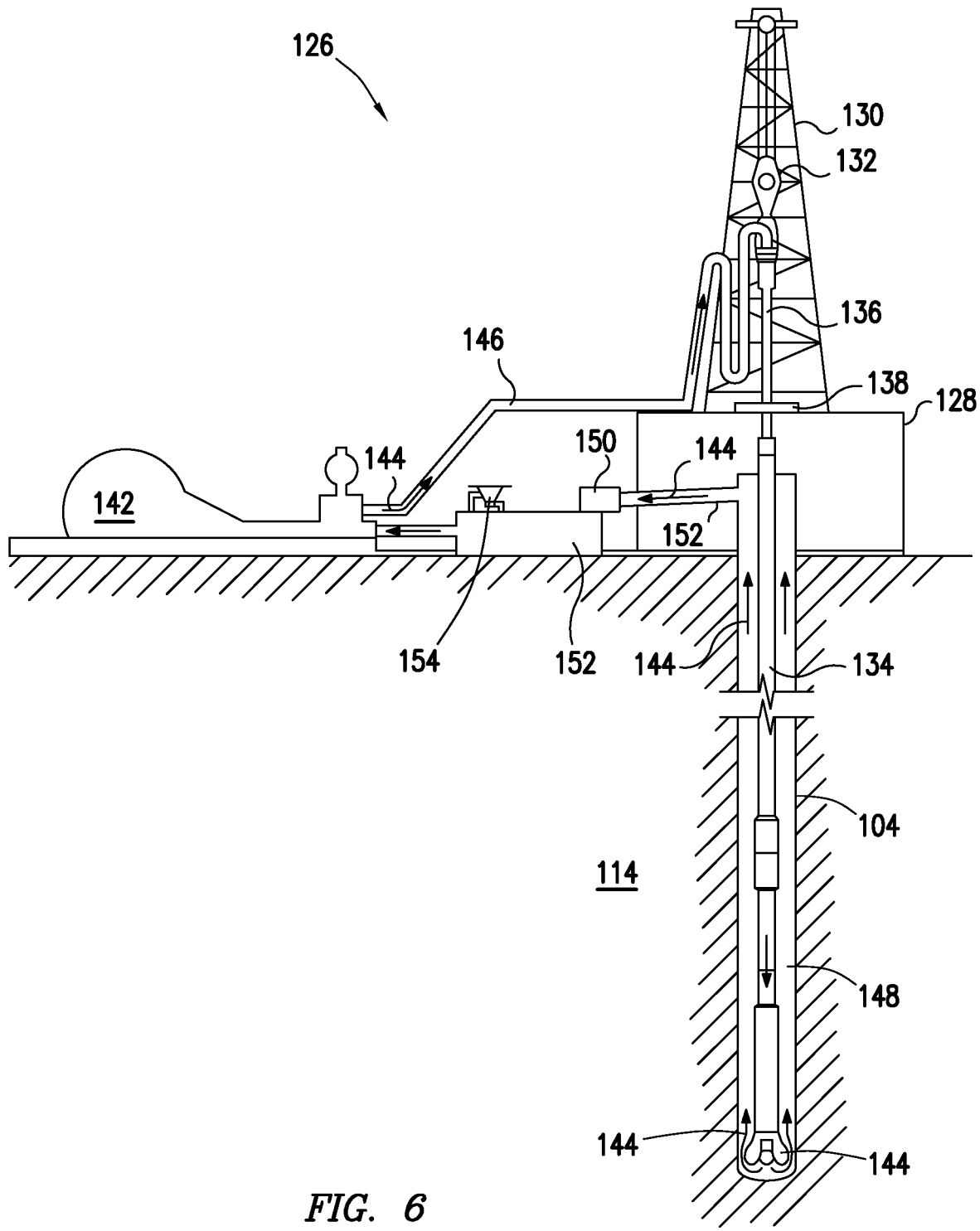
FIG. 6 is a schematic illustration of an example drilling system.

The hydrogel particles may also be included in drilling fluids, for example, as fluid loss control agents. The disclosed drilling fluids may be used to aid in the drilling of a wellbore, e.g., by circulating drill cuttings back to the surface via the annulus between the drill string and the walls of the wellbore. With reference to FIG. 6, the disclosed treatment fluids may directly or indirectly affect one or more components or pieces of equipment associated with an example wellbore drilling assembly 126. It should be noted that while FIG. 6 generally depicts drilling assembly 126 that is land based, those skilled in the art will readily recognize that the principles described herein are equally applicable to subsea drilling operations that employ floating or sea-based platforms and rigs, without departing from the scope of the disclosure.

As illustrated, the drilling assembly 126 may include a drilling platform 128 that supports a derrick 130 having a traveling block 132 for raising and lowering a drill string 134. The drill string 134 may include, but is not limited to, conduits such as drill pipe and coiled tubing, as generally known to those skilled in the art. A kelly 136 supports the drill string 134 as it is lowered through a rotary table 138. A drill bit 140 may be attached to the distal end of the drill string 134 and may be driven either by a downhole motor and/or via rotation of the drill string 134 from the well surface. As the drill bit 140 rotates, it creates a wellbore borehole 104 that penetrates various subterranean formations 114.

A pump 142 (e.g., a mud pump) may circulate drilling fluid 144, which may have been stored in a vessel prior to use, comprising the hydrogel particles disclosed herein, through a feed pipe 146 and to the kelly 136, which conveys the drilling fluid 144 downhole through the interior of the drill string 134 and through one or more orifices in the drill bit 140. The pump 142 may be part of a pumping system. The drilling fluid 144 is then circulated back to the surface via an annulus 148 defined between the drill string 108 and the walls of the borehole 104. As the drilling fluid 144 is pumped back to the surface, hydrogel particles in the drilling fluid 144 may swell and aid in the bridging/plugging of fractures and/or formation porosity, thus reducing loss of the drilling fluid 144 into subterranean formation 114.

At the surface, the recirculated or spent drilling fluid 144 exits the annulus 148 and may be conveyed to one or more fluid processing unit(s) 150 via an interconnecting flow line 152. After passing through the fluid processing unit(s) 150, a "cleaned" drilling fluid 144 is deposited into a nearby retention pit 152 (i.e., a mud pit), which may function as a vessel or storage system for the drilling fluid. While illustrated as being arranged at the outlet of the wellbore 104 via the annulus 148, those skilled in the art will readily appreciate that the fluid processing unit(s) 150 may be arranged at any other location in the drilling assembly 126 to facilitate its proper function, without departing from the scope of the scope of the disclosure. In optional examples, at least a portion of the drilling fluid 144 may be recovered and used as or in another treatment fluid, for example, as a displacement fluid, spotting fluid, a cement, or the like.

The drilling fluid 144 may be added to a mixing hopper 154, a type of vessel, communicably coupled to or otherwise in fluid communication with the retention pit 152. The mixing hopper 154 may include, but is not limited to, mixers and related mixing equipment known to those skilled in the art. In alternative embodiments, however, the drilling fluid 144 may not be added to a mixing hopper. In at least one example, there could be more than one retention pit 152, such as multiple retention pits 152 in series. Moreover, the retention pit 152 may be representative of one or more fluid storage facilities and/or units where the disclosed treatment fluids may be stored, reconditioned, and/or regulated until used as a treatment fluid, for example, as a drilling fluid 144.

The hydrogel particles may directly or indirectly affect the components and equipment of the drilling assembly 126. For example, the drilling fluid 144 may directly or indirectly affect the fluid processing unit(s) 150 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 150 may further include one or more sensors, gauges, pumps, compressors, and the like used store, monitor, regulate, and/or recondition the treatment fluids.

The disclosed hydrogel particles may directly or indirectly affect the pump 142 and any pumping systems, which representatively includes any conduits, pipelines, trucks, tubulars, and/or pipes which may be coupled to the pump and/or any pumping systems and may be used to fluidically convey the drilling fluid downhole, any pumps, compressors, or motors (e.g., topside or downhole) used to drive the drilling fluid into motion, any valves or related joints used to regulate the pressure or flow rate of the drilling fluid, and any sensors (i.e., pressure, temperature, flow rate, etc.), gauges, and/or combinations thereof, and the like. The disclosed drilling fluids may also directly or indirectly affect the mixing hopper 334 and the retention pit 332 and their assorted variations.

The disclosed hydrogel particles may also directly or indirectly affect the various downhole equipment and tools that may come into contact with the drilling fluids such as, but not limited to, the drill string 134, any floats, drill collars, mud motors, downhole motors and/or pumps associated with the drill string 134, and any MWD/LWD tools and related telemetry equipment, sensors or distributed sensors associated with the drill string 134. The disclosed hydrogel particles may also directly or indirectly affect any downhole heat exchangers, valves and corresponding actuation devices, tool seals, packers and other wellbore isolation devices or components, and the like associated with the wellbore 104. The hydrogel particles may also directly or indirectly affect the drill bit 140, which may include, but is not limited to, roller cone bits, PDC bits, natural diamond bits, any hole openers, reamers, coring bits, etc.

While not specifically illustrated herein, the drilling fluids may also directly or indirectly affect any transport or delivery equipment used to convey the drilling fluids to the drilling assembly 126 such as, for example, any transport vessels, conduits, pipelines, trucks, tubulars, and/or pipes used to fluidically move the drilling fluids from one location to another, any pumps, compressors, or motors used to drive the drilling fluids into motion, any valves or related joints used to regulate the pressure or flow rate of the drilling fluids, and any sensors (i.e., pressure and temperature), gauges, and/or combinations thereof, and the like.

The exemplary hydrogel particles disclosed herein may directly or indirectly affect one or more components or pieces of equipment associated with the preparation, delivery, recapture, recycling, reuse, and/or disposal of the hydrogel particles. For example, the hydrogel particles composition may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the sealant composition. The hydrogel particles may also directly or indirectly affect any transport or delivery equipment used to convey the hydrogel particles to a well site or downhole such as, for example, any transport vessels, conduits, pipelines, trucks, tubulars, and/or pipes used to compositionally move the hydrogel particles from one location to another, any pumps, compressors, or motors (e.g., topside or downhole) used to drive the hydrogel particles into motion, any valves or related joints used to regulate the pressure or flow rate of the hydrogel particles (or fluids containing the same hydrogel particles, and any sensors (i.e., pressure and temperature), gauges, and/or combinations thereof, and the like. The disclosed hydrogel particles may also directly or indirectly affect the various downhole equipment and tools that may come into contact with the hydrogel particles such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of providing conformance, fluid loss control, or diversion in a subterranean formation, comprising:
   providing a treatment fluid comprising:
   a base fluid, wherein the base fluid comprises an aqueous salt solution comprising an acid;
   a hydrogel particle,
   wherein the hydrogel particle comprises a modified biopolymer that is crosslinked, the modified biopolymer comprising a biopolymer backbone and synthetic side chains; wherein the biopolymer backbone comprises a collagen backbone, wherein the synthetic side chains comprising acrylamidosulfonic acids, acrylamide-sulfonates, methacrylamido-sulfonic acids, methacrylamido sulfonates, or combinations thereof, and wherein the modified biopolymer is crosslinked with a crosslinker comprising N,N'-methylenebisacrylamide (MBA), N,N'-ethylenebisacrylamide, bis-acryloylpiperazine bis-acryloylcystamine, N,N'-polyoxyalkylen-bisacrylamide, N,N'-polyoxyalkylen-bisacrylamide or combinations thereof, and
   wherein the treatment fluid has a pH of from about 8 to about 12;
   introducing the treatment fluid into a subterranean formation penetrated by a wellbore; and
   contacting the hydrogel particles in the subterranean formation with an oxidizer.

2. The method of claim 1, further comprising allowing the first and the second hydrogel particles to degrade over time in the subterranean formation.

3. The method of claim 1, further comprising forming a barrier comprising the hydrogel particles in the subterranean formation, wherein the barrier reduces flow of fluid through in the subterranean formation, reduces fluid loss from the treatment fluid or another treatment fluid introduced into the wellbore, and/or diverts a treatment fluid subsequently introduced into the wellbore to another portion of the subterranean formation.

4. The method of claim 1, wherein the base fluid comprises an aqueous salt solution having a salt concentration from about 0.1% to about 10% by weight.

5. The method of claim 1, wherein the treatment fluid is a drilling fluid circulated into a wellbore through a drill bit.

6. The method of claim 1, wherein the first and second hydrogel particles have an average particle size in the range of about 20 microns to about 200 microns.

7. The method of claim 1, wherein the first and second hydrogel particles have an average article size in the range of about 5 microns to about 4000 microns.

8. The method of claim 1, wherein the oxidizer is sodium persulfate.

9. A treatment fluid comprising:
   a base fluid, wherein the base fluid comprises an aqueous salt solution comprising an acid;
   a hydrogel particle, wherein the hydrogel particle comprises modified biopolymers that are crosslinked, the modified biopolymers comprising a biopolymer backbone and synthetic side chains derived from synthetic monomers, wherein the biopolymer backbone comprises a collagen backbone, and wherein the synthetic side chains comprise 2-acrylamido-2methylpropane sulfonic acid, and wherein the modified biopolymer is crosslinked with a crosslinker comprising N,N'-methylenebisacrylamide (MBA), N,N'-ethylenebisacrylamide, bis-acryloylpiperazine bis-acryloylcystamine, N,N'-polyoxyalkylen-bisacrylamide, N,N'-polyoxyalkylen-bisacrylamide and combinations thereof; and
   sodium persulfate as an oxidizer, and
   wherein the treatment fluid has a pH of from about 8 to about 12.

10. The treatment fluid of claim 9, wherein the base fluid comprises an aqueous salt solution having a salt concentration from about 0.1% to about 10% by weight.

11. A method of providing conformance, fluid loss control, or diversion in a subterranean formation, comprising:
    providing a treatment fluid comprising:
    a base fluid, wherein the base fluid comprises an aqueous salt solution comprising hydrochloric acid; and
    hydrogel particles,
    wherein the hydrogel particles comprise modified biopolymers that are crosslinked, the modified biopolymers comprising a biopolymer backbone and synthetic side chains; wherein the biopolymer backbone comprises a collagen backbone, wherein the synthetic side chains comprise 2-acrylamido-2methylpropane sulfonic acid, and wherein the hydrogel particles are present in an amount of about 0.1% to about 2% by weight of the treatment fluid, and wherein the modified biopolymer is crosslinked with a crosslinker comprising N,N'-methylenebisacrylamide (MBA), N,N'-ethylenebisacrylamide, bis-acryloylpiperazine bis-acryloylcystamine, N,N'-polyoxyalkylen-bisacrylamide, N,N'-polyoxyalkylen-bisacrylamide and combinations thereof, and wherein the treatment fluid has a pH of from about 8 to about 12;

introducing the treatment fluid into a subterranean formation penetrated by a wellbore; and contacting the hydrogel particles in the subterranean formation with sodium persulfate.

12. The method of claim 11, further comprising allowing the hydrogel particles to degrade over time in the subterranean formation.

13. The method of claim 11, further comprising forming a barrier comprising the hydrogel particles in the subterranean formation, wherein the barrier reduces flow of fluid through in the subterranean formation, reduces fluid loss from the treatment fluid or another treatment fluid introduced into the wellbore, and/or diverts a treatment fluid subsequently introduced into the wellbore to another portion of the subterranean formation.

14. The method of claim 11, wherein the base fluid comprises an aqueous salt solution having a salt concentration from about 0.1% to about 10% by weight.

15. The method of claim 11, wherein the treatment fluid is a drilling fluid circulated into a wellbore through a drill bit.

16. The method of claim 11, wherein the hydrogel particles have an average particle size in the range of about 20 microns to about 200 microns.

17. The method of claim 11, wherein the hydrogel particles have an average article size in the range of about 5 microns to about 4000 microns.

* * * * *

UNITED STATES PATENT AND TRADEMARK OFFICE
CERTIFICATE OF CORRECTION

| | |
|---|---|
| PATENT NO. | : 11,286,413 B2 |
| APPLICATION NO. | : 15/771756 |
| DATED | : March 29, 2022 |
| INVENTOR(S) | : Ravikant S. Belakshe, Pratiksha Shivaji Meher and Larry Steven Eoff |

It is certified that error appears in the above-identified patent and that said Letters Patent is hereby corrected as shown below:

In the Claims

Claim 7, Line 23 please remove "particles have an average article size" and replace with --particles have an average particle size--.

Claim 17, Line 15 please remove "particles have an average article size" and replace with --particles have an average particle size--.

Signed and Sealed this
Twenty-fourth Day of May, 2022

Katherine Kelly Vidal
*Director of the United States Patent and Trademark Office*